United States Patent [19]

Muraoka

[11] Patent Number: 4,652,949
[45] Date of Patent: Mar. 24, 1987

[54] MAGNETIC DISK LOADING/EJECTING APPARATUS

[75] Inventor: Takao Muraoka, Kawasaki, Japan

[73] Assignee: Tokyo Shibaura Denki Kabushiki Kaisha, Kawasaki, Japan

[21] Appl. No.: 566,731

[22] Filed: Dec. 29, 1983

[30] Foreign Application Priority Data

Mar. 28, 1983 [JP] Japan .................................. 58-51979

[51] Int. Cl.$^4$ .................... G11B 15/00; G11B 5/012
[52] U.S. Cl. ..................................... 360/96.5; 360/97
[58] Field of Search ..................... 360/97–99, 360/133, 96.5, 93, 96.1, 96.6, 85; 369/77.2

[56] References Cited

U.S. PATENT DOCUMENTS

| | | | |
|---|---|---|---|
| 4,071,860 | 1/1978 | Watanabe | 360/96.5 |
| 4,368,495 | 1/1983 | Hamanaka et al. | 360/97 |
| 4,546,396 | 10/1985 | Schatteman | 360/96.5 |

FOREIGN PATENT DOCUMENTS

| | | |
|---|---|---|
| 0082505 | 6/1983 | European Pat. Off. . |
| 3229468 | 2/1983 | Fed. Rep. of Germany . |
| 55-58858 | 1/1980 | Japan . |
| 1429256 | 3/1976 | United Kingdom . |
| 1464935 | 2/1977 | United Kingdom . |

*Primary Examiner*—A. J. Heinz

*Attorney, Agent, or Firm*—Oblon, Fisher, Spivak, McClelland & Maier

[57] ABSTRACT

A bucket is so supported by a pair of supporters that it can move up and down, through vertical slits formed in the supporters and pins formed on the bucket and entering the vertical slits. A guide member can reciprocate horizontally, along one of the supporters. The guide member has slanted slits into which the pins on the bucket are individually fitted. When a cartridge is horziontally inserted into the bucket, a slider moves forward in conjunction with the cartridge, thereby rocking the interlocking body retaining the guide member, to disengage the guide member from the interlocking body. The guide member is moved in the cartridge retreating direction by a tension spring, and the bucket is lowered by the joint action of the slanted slits, the vertical slits and the pins. Thus, a magnetic disk engages with the shaft of a motor. If an ejecting lever is pushed in, the guide member moves in the cartridge insertion direction and the bucket is raised by the action of the slanted slits, etc. Thus, the magnetic disk is disengaged from the motor shaft. At the same time, a stopper is also raised, so that the cartridge is retained by the stopper. If the ejecting lever is released, the stopper is then lowered, so that the cartridge is pushed out of the bucket by the slider.

10 Claims, 12 Drawing Figures

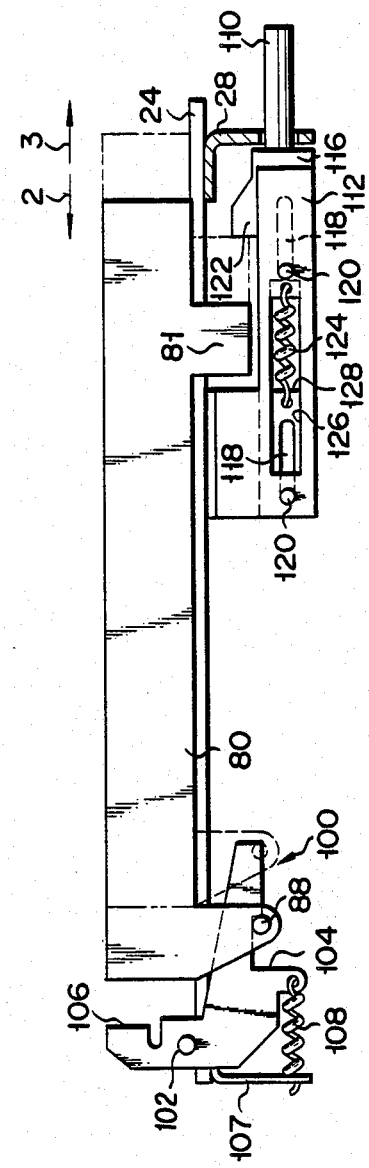
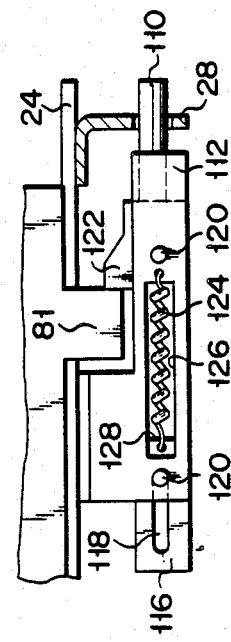
FIG. 9
FIG. 10

MAGNETIC DISK LOADING/EJECTING APPARATUS

FIELD OF THE INVENTION

The present invention relates to a magnetic disk loading/ejecting apparatus for loading and ejecting a magnetic disk which serves as a recording medium contained in a cartridge.

BACKGROUND OF THE INVENTION

Magnetic disks which serve as recording media, i.e., the so-called floppy disks, are relatively inexpensive and good in workability. Recently, therefore, magnetic disk apparatuses employing magnetic disks have come into wide use.

To miniaturize the magnetic disk apparatuses, the magnetic disks have been reduced in size and improved in recording density. In the miniaturization of magnetic disk apparatuses, it is necessary to reduce the size of the apparatus for loading the recording medium into and ejecting it from the magnetic disk apparatus housing, as well as the size of the recording medium or magnetic disk.

FIGS. 1 and 2 show a prior art magnetic disk loading/ejecting apparatus. In this apparatus, bucket 12 is swingably supported on a chassis 10. A cartridge 1 containing a floppy disk is inserted into the bucket 12 and directed toward the swinging center of the bucket 12. A stopper 12 is swingably supported on the chassis 10. The stopper 22 is so designed that its upper retaining portion engages a pin 16 which protrudes from one lateral face of the bucket 12, thereby locating the bucket 12 in a floppy disk operating position. The stopper 22 is rocked by an ejecting lever 18, and it is urged by a tension spring 20 to rotate toward the position where the retaining portion of the stopper 22 engages with the pin 16. Thus, the cartridge 1 is loaded when it is inserted into the bucket 12, to rock the same toward the chassis 10, thereby causing the pin 16 to be held by the retaining portion of the stopper 22. The cartridge 1 is ejected when the ejecting lever 18 is pushed, to disengage the pin 16 from the retaining portion of the stopper 22, thereby causing the bucket 12 to be rocked away from the chassis 10 by a coil spring 14.

In the prior art loading/ejecting apparatus, however, it is necessary to rock the cartridge with a substantial radius of rotation, thereby preventing the magnetic head from being crushed at the time of the cartridge loading or ejecting operation. Thus, the rocking of the bucket 12 requires a substantial space, resulting in an increase in the size of the prior art loading/ejecting apparatus. The bulkiness of the loading/ejecting apparatus constitutes a hindrance to the miniaturization of the magnetic disk aparatus.

While a technique has been proposed for use in preventing the magnetic head from being crushed by the cartridge loading or ejecting operation, the conventional technique of this type would only complicate the structure and increase the size of the apparatus.

OBJECTS OF THE INVENTION

A primary object of the present invention is to provide a magnetic disk loading/ejecting apparatus which is reduced in size and is capable of being used in a miniaturized magnetic disk apparatus.

Another object of the invention is to provide a magnetic disk loading/ejecting apparatus which prevents a magnetic head from being crushed during the loading and ejecting operations.

SUMMARY OF THE INVENTION

According to the invention, a magnetic disk loading/ejecting apparatus is provided in which a magnetic disk in a cartridge is engaged with and disengaged from the shaft of a motor mounted on a chassis. A bucket has a sliding surface substantially at right angles to the motor shaft, and the cartridge is inserted into the bucket, moving substantially parallel to the sliding surface. Supporting means secured to the chassis supports the bucket so that the bucket can move along the motor shaft. A guide member can reciprocate between a first position in front and a second position to the rear of the direction of cartridge insertion. The guide member is so adapted as to move from the first position toward the second position, thereby moving the bucket in such a direction that the magnetic disk engages with the motor shaft, and to move from the second position toward the first position, thereby moving the bucket in such a direction that the magnetic disk is disengaged from the motor shaft. The guide member is urged in the retreating direction of the cartridge by urging means. Retaining means can retain the guide member which is urged by the urging means, retaining said guide member in the first position. A sliding member of sliding means can slide on the sliding surface of the bucket in the cartridge insertion and retreating directions. The sliding member is so adapted as to release the guide member from the retaining means when the cartridge is inserted at a predetermined position within the bucket.

According to the present invention, the cartridge is inserted into the bucket, moving in a direction which is at right angles to the motor shaft. Since the sliding member releases the guide member from the retaining means when the cartridge is inserted into the predetermined position, the guide member is moved from the first position toward the second position (in the cartridge retreating direction) by the urging means. Accordingly, the bucket is moved by urging means in such a direction that the magnetic disk engaes the motor shaft. Namely, the magnetic disk moves along the motor shaft with its surface at right angles to the motor shaft. Thus, the cartridge may be loaded or ejected by only moving the bucket in the direction at right angles to the sliding surface, i.e., along the motor shaft, for a distance long enough to disengage the magnetic disk from the motor shaft. Accordingly, the loading/ejecting apparatus may be miniaturized, so that the magnetic disk apparatus using this loading/ejecting apparatus can easily be reduced in size. Since the magnetic disk approaches or is removed from a magnetic head, moving at right angles with respect to the surface of said head, the magnetic head is prevented from being crushed at the time of the loading and ejecting operations. The magnetic disk is loaded and ejected by the joint action of the sliding member, guide member and retaining means, so that the loading/ejecting apparatus of the invention is simple in construction.

BRIEF DESCRIPTION OF THE DRAWINGS

FIGS. 9 and 10 are partial side views for illustrating the operation of an ejecting mechanism.

DETAILED DESCRIPTION OF THE PREFERRED EMBODIMENT

Figure 1:
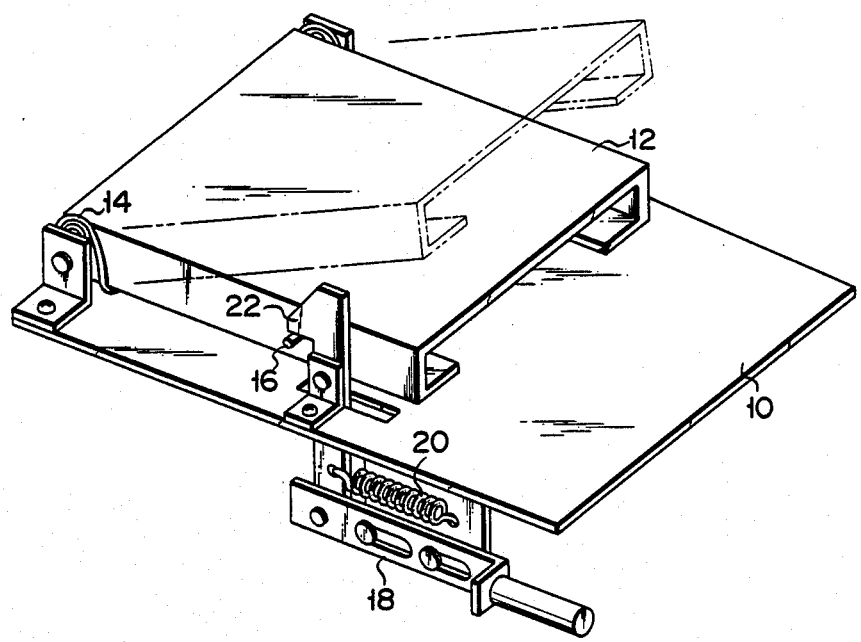
FIG. 1 is a perspective view of a prior art loading/ejecting apparatus.
Figure 2:
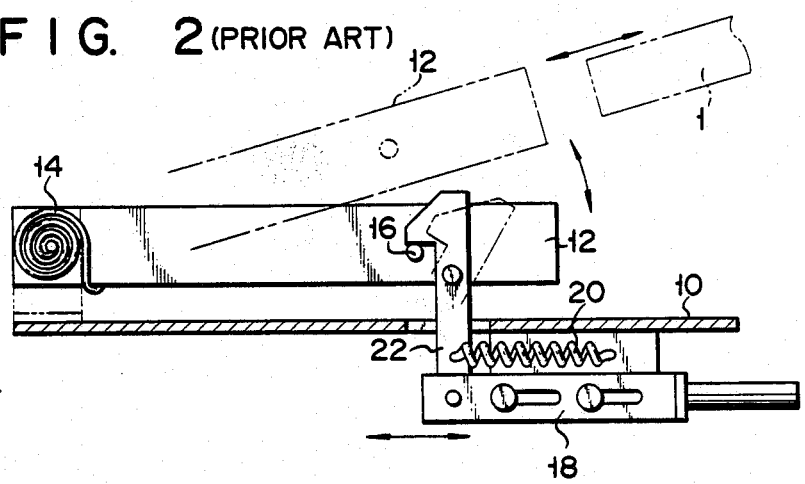
FIG. 2 is a side view for illustrating the operation of the loading/ejecting apparatus of FIG. 1.
Figure 3:
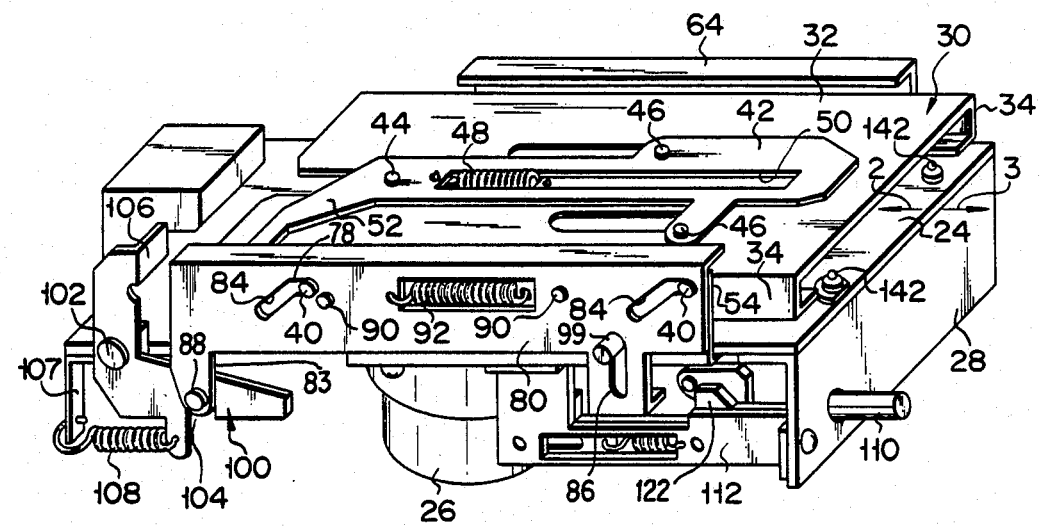
FIG. 3 is a perspective view of a magnetic disk loading/ejecting apparatus according to one embodiment of the present invention.
Figure 4:
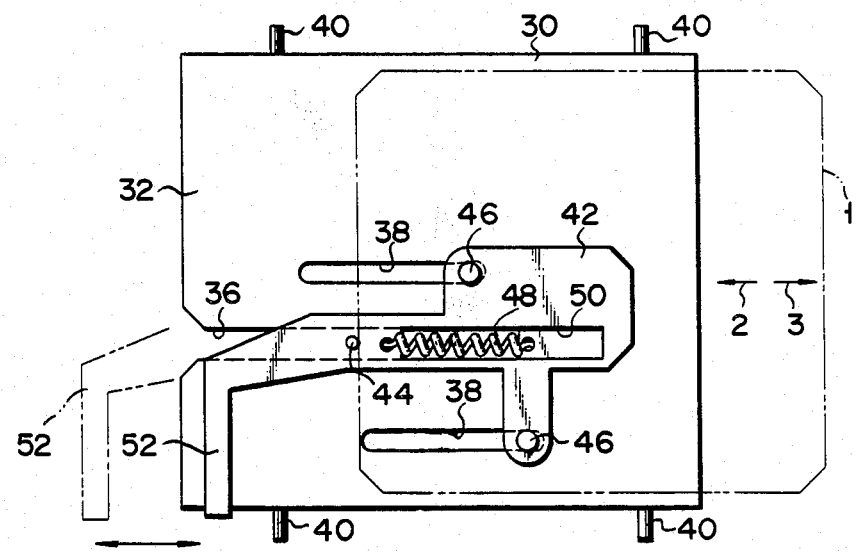
FIG. 4 is a plan view of the loading/ejecting apparatus of FIG. 3 for illustrating the operation of a slider.

FIGS. 3 and 4 are a perspective view and a plan view, respectively, of a magnetic disk loading/ejecting apparatus according to one embodiment of the present invention. A chassis 24 is secured to the housing of the apparatus, so as to extend substantially horizontally. A motor 26 for rotating a floppy disk is mounted on the chassis 24, with its shaft being positioned vertically upward. A front plate 28 extends downward from the front end portion of the chassis 24.

A bucket 30 has a sliding surface 32 and a pair of L-shaped lateral portions 34 extending in the longitudinal direction of the sliding surface 32. A cartridge 1 having the floppy disk and a hard casing containing the same is inserted in the direction indicated by an arrow 2 into the bucket 30 from the front plate side. The cartridge 1 is inserted parallel to the sliding surface 32 and housed in the bucket 30, guided by the L-shaped lateral portions 34. The cartridge 1 is moved in the direction indicated by an arrow 3 when it is disengaged from the bucket 30.

Figure 8:
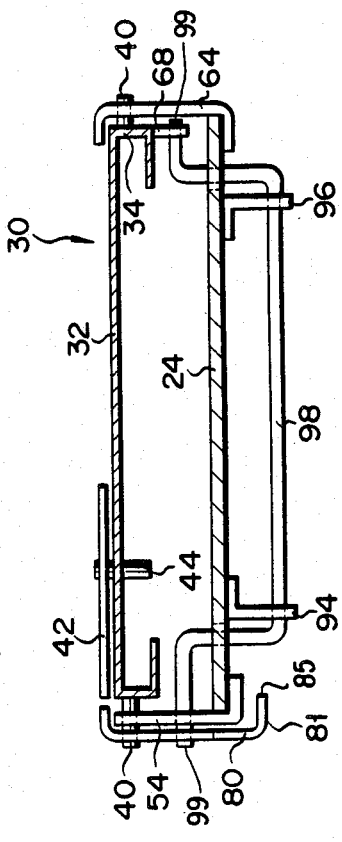
FIG. 8 is a front view of the loading/ejecting apparatus of FIG. 3.

A flat slider 42 is mounted on the slider surface 32 of the bucket 30 so as to be able to slide in the cartridge insertion direction (arrow 2) and disengaging direction (arrow 3) on the sliding surface 32. The sliding surface 32 has a slider guide slit 36 extending directly ahead, in the directions of arrows 2 and 3, and a pair of slider holding slits 38 extending parallel to the slider guide slit 36 and on both sides thereof. The flat slider 42 has a slider guide pin 44 and a pair of slider holding pins 46 fixed to the flat slider 42, protruding downward therefrom. As shown in FIG. 8, the slider guide pin 44 is long enough to project downward from the sliding surface 32 and to be engaged by a cartridge 1 during insertion thereof. Thus, movement of the cartridge 1 in the direction of the arrow 2 causes the flat slider 42 to move in the direction of the arrow 2 relative to the sliding surface 32 of the bucket 30.

Each of the slider holding pins 46 has an upper end portion attached to the flat slider 42, a central portion fitted into each corresponding slider holding slit 38, and a lower end portion having a diameter greater than the width of the slider holding slit 38 and abutting against the sliding surface 32. The flat slider 42 can slide in the directions of the arrows 2, 3, on the sliding surface 32, with the aid of the slits 36, 38 and the pins 44, 46.

The flat slider 42 has a slit 50 corresponding in position to the slider guide slit 36. A tension spring 48 is disposed in the position where the two slits 36 and 50 overlap each other so that the two ends of the tension spring 48 are retained on the sliding surface 32 and the flat slider 42, respectively. The flat slider 42 is urged in the direction of the arrow 3 by the tension spring 48.

The flat slider 42 has an engaging portion 42 and its front end portion as defined with respect to the direction of the arrow 2. The usage of the adjectives "front" and "rear" will hereinafter be based on the direction of arrow 2. A pair of pins 40 protrude individually from each L-shaped lateral portion 34 of the bucket 30, being spaced in the directions of the arrow 2, 3.

Figure 5:
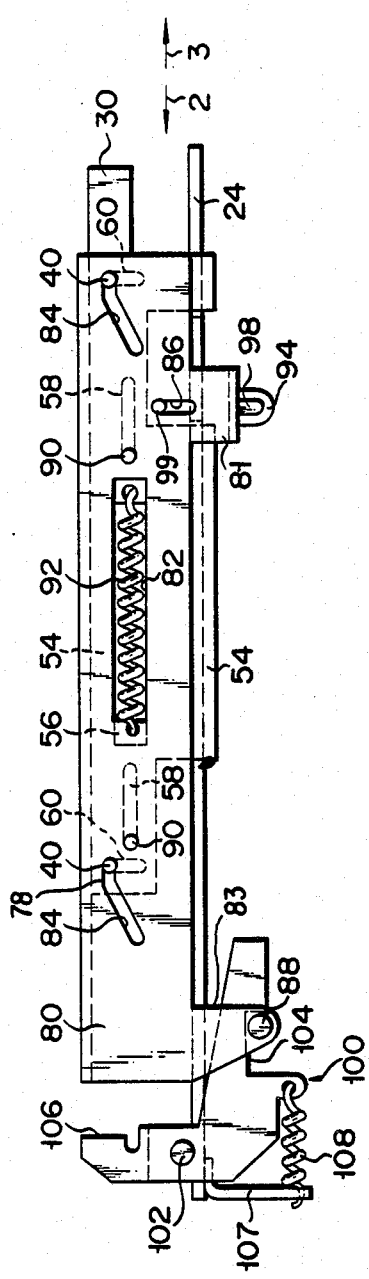
FIGS. 5 and 6 are left side views of the loading/ejecting apparatus of FIG. 3 for illustrating the operation of a guide member.
Figure 6:
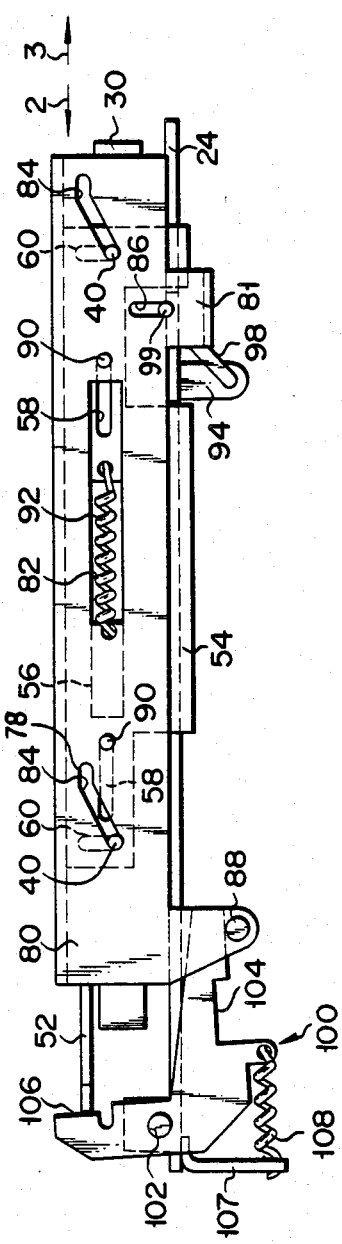
Figure 7:
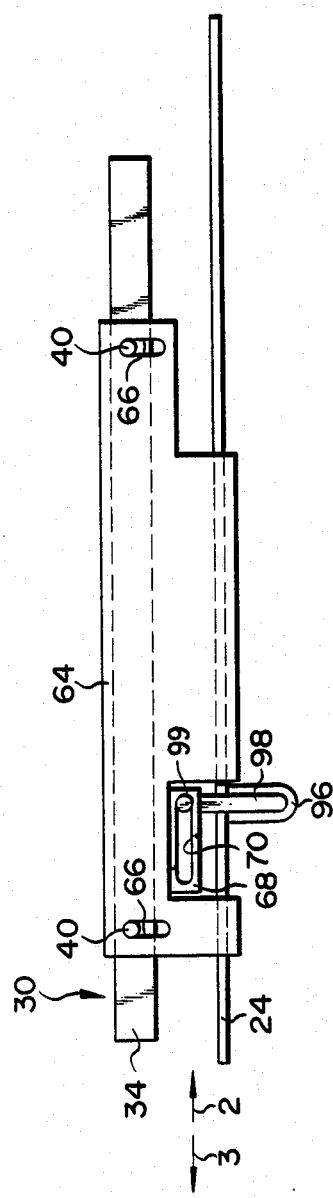
FIG. 7 is a right side view of the loading/ejecting apparatus of FIG. 3.

Supporters 54, 64 are individually attached to both sides of the chassis 24, extending in the directions of the arrows 2, 3 and facing each other. As shown in FIGS. 5 and 6, the supporter 54 has a pair of vertical slits 60, in alignment with the pins 40 protruding from one of the L-shaped lateral portions 34 of the bucket 30. Similarly, as shown in FIG. 7, the supporter 64 has a pair of vertical slits 66 in alignment with the pins 40 protruding from the other one of the L-shaped lateral portions 34 of the bucket 30. The pins 40 are fitted into the corresponding vertical slits 60, 66. Thus, the bucket 30 can move up and down while being guided by the vertical slits 60, 66 and the pins 40.

The supporter 54 is further provided with a pair of horizontal slits 58 which are spaced in the directions of the arrows 2, 3. A rectangular horizontal opening 56 extending in the directions of the arrows 2, 3 is bored through the supporter 54, between the horizontal slits 58.

A guide plate 68 (shown in FIG. 7) is secured to the lower end of that L-shaped lateral portion 34 of the bucket 30 which is on the side of the supporter 64. The guide plate 68 has a horizontal slit 70 extending in the directions of the arrows 2, 3.

A guide member 80 extending in the directions of the arrows 2, 3 is attached to the supporter 54 in such a way as to be slidable relative thereto. As shown in FIGS. 5 and 6, the guide member 80 has a pair of guide pins 90 arranged in positions aligning with the horizontal slits 58 of the supporter 54. The guide pins 90 are fitted in the corresponding horizontal slits 58. Thus, guided by the guide pins 90 and the horizontal slits 58, the guide member 80 can reciprocate between a first position in front and a second position in the rear.

A rectangular horizontal opening 82 similar to the rectangular horizontal opening 56 is bored through the guide member 80 between the two guide pins 90. A tension spring 92 is disposed in the position where the two horizontal openings 56 and 82 overlap each other. The two ends of the tension spring 92 are fixed to the supporter 54 and the guide member 80, respectively. Thus, the guide member 80 is urged in the direction of the arrow 3 by the tension spring 92.

The guide member 80 has a pair of slanted slits 84 at the front and rear end portions thereof. The slanted slits 84 extend at an angle with respect to the direction of the arrow 2. The slanted slits 84 are so designed that the lower end portion of each slanted slit 84 is aligned with a corresponding vertical slit 60 when the guide member 80 is in the second position i.e., when the guide pins 90 are at the rear end portions of the corresponding horizontal slits 58 (see FIG. 6). Similarly, the upper end portion of each slanted slit 84 is aligned with a corresponding vertical slit 60 when the guide member 80 is in the first position i.e., when the guide pins 90 are at the front end portions of the corresponding horizontal slits 58 (see FIG. 5). Each slanted slit 84 has a short horizontal portion 78 at the upper end portion thereof.

Since the pins 40 penetrating the vertical slits 60 are also fitted in the corresponding slanted slits 84, the pins 40 are located in the positions where the slits 60 and 84 intersect. Accordingly, when the guide member 80 moves in the direction of the arrow 2, the pins 40 are moved up inside the vertical slits 60 by the corresponding slanted slits 84 to raise the bucket 30. When the guide member 80 moves in the direction of the arrow 3, on the other hand, the pins 40 are moved down inside the vertical slits 60 by the corresponding slanted slits 84 to lower the bucket 30. When the pins 40 are located at the upper ends of the corresponding vertical slits 60, as shown in FIG. 5, the cartridge 1 contained in the bucket 30 is disengaged from the motor 26 to be allowed to move in the direction of the arrow 3 along the L-shaped lateral portions 34 of the bucket 30. When the pins 40 are located at the lower ends of the corresponding vertical slits 60, as shown in FIG. 6, the floppy disk in the cartridge 1 engages the drive shaft of the motor 26, so that the cartridge 1 is set in a drive system therefor.

The guide member 80 has a vertical slit 86 extending vertically at a downwardly extending portion 81 which is formed at the rear portion of the guide member 80. The guide member 80 also has an extending portion 83 projecting downward from its front end portion. A pin 88 protrudes from the extending portion 83.

As shown in FIG. 8, shaft members 94 and 96 are attached to the undersurface of the chassis 24, on the sides of supporters 54 and 64, respectively. The shaft members 94 and 96 are spaced apart and located in the facing direction of the supporters 54, 64. A substantially U-shaped arm 98 is supported by the shaft members 94, 96. Both end portions 99 of the substantially U-shaped arm 98 extend outward, in a substantially horizontal direction. The two end portions 99 of the substantially U-shaped arm 98 are fitted in the vertical slit 86 of the guide member 80 and the horizontal slit 70 of the guide plate 68, respectively.

When the guide member 80 is located in the front end position (FIG. 5), one end portion 99 of the substantially U-shaped arm 98 is at the upper end of the vertical slit 86. When the guide member 80 is located in the rear end position (FIG. 6), the one end portion 99 of the substantially U-shaped arm 98 is at the lower end of the vertical slit 86. As the guide member 80 moves in the direction of the arrow 3, therefore, the substantially U-shaped arm 98 rocks around its horizontally extending lower portion, which is supported by the shaft members 94 and 96. As the substantially U-shaped arm 98 rocks in this manner, the other end portion 99 of the substantially U-shaped arm 98 moves from the front end position (FIG. 7) toward the rear end position in the horizontal slit 70, thereby lowering the guide plate 68 and the bucket 30. Thus, when the guide member 80 moves in the direction of the arrow 3, the L-shaped lateral portion 34 of the bucket 30 on the side of the supporter 54 is so urged as to be moved downward by the agency of the slanted slits 84 and the pins 40, while the L-shaped lateral portion 34 on the side of the supporter 64 of the bucket 30 is also urged downward by the agency of the substantially U-shaped arm 98 and the horizontal slit 70. Specifically, the bucket 30 descends smoothly, as the guide member 80 moves in the direction of the arrow 3.

An interlocking body 100 is pivotally mounted on a pivot 102 at the front end portion of the chassis 24, so that it can rotate about a rotational axis which extends in the facing direction of the supporters 54, 64. The interlocking body 100 has a rectangular notch 104 which opens on that portion of its lower edge which is near the guide member 80. The pin 88 protruding from the guide member 80 can engage the notch 104. As shown in FIG. 6, the interlocking body 100 has a retaining portion 106 against which the engaging portion 52 is to abut.

A downwardly extending support strip 107 is fixed to the under surface of the chassis 24. The interlocking body 100 is urged by a tension spring 108 between itself and the downwardly extending support strip 107 to rock in a direction such as to move down the rectangular notch 104. When the pin 88 engages the rectangular notch 104, as shown in FIG. 5, the guide member 80 stands still in the front end position against the tensile force of the tension spring 92. When the engaging portion 52 abuts against the retaining portion 106 of the interlocking body 100 to rock the interlocking body 100 in a direction such as to move up the rectangular notch 104, the pin 88 is disengaged from the notch 104. Thereupon, the guide member 80 is moved in the direction of the arrow 3 by the urging force of the tension spring 92.

Referring now to FIGS. 9 to 12, an ejecting mechanism (not shown in FIGS. 4 to 8) may be described as follows. The detailed illustration of the guide member 80 and other members is omitted in FIGS. 9 to 12. FIGS. 9 and 10 show an ejecting lever 110 for disengaging the cartridge from the drive system etc. A support member 112 is attached to that portion of the undersurface of the chassis 24 which is near the front plate 28. The ejecting lever 110 is attached to the rear end of an ejecting member 116 which slides on the support member 112.

The ejecting member 116 has a pair of horizontal slits 118 extending in the directions of arrows 2 and 3. The support member 112 has a pair of pins 120 which are individually fitted into the horizontal slits 118. As the pins 120 are moved in the horizontal slits 118, the ejecting member 116 reciprocates in the directions of the arrows 2 and 3, and the ejecting lever 110 projects to the outside of the front plate 28.

The supporting member 112 has a rectangular horizontal opening 126 which extends in the directions of the arrows 2, 3 between the pins 120. Also, the ejecting member 116 has a rectangular horizontal opening 128 which extends in the directions of the arrows 2 and 3 between the horizontal slits 118. A tension spring 124 is disposed at the position where the rectangular horizontal openings 126 and 128 overlap each other. The two ends of the tension spring 124 are attached to the ejecting member 116 and the support member 112, respectively. Thus, the ejecting member 116 and the ejecting lever 110 are urged by the tension spring 124 in a direction (direction of the arrow 3) such that the ejecting lever 110 projects outward from the front plate 28.

An upwardly projecting engaging portion 122 is formed on the ejecting member 116, located between the downwardly extending portion 81 of the guide member 80 and the front plate 28. As shown in FIG. 8, the downwardly extending portion 81 of the guide member 80 has a horizontal portion 84 at its bottom end. The horizontal portion 85 extends toward the shaft member 94. Accordingly, even when the guide member 80 is at its front end position, where the pin 88 engages with the rectangular notch 104, as shown in FIG. 9, the ejecting lever 110 is at its rear end position.

If the ejecting lever 110 is pushed in the direction of arrow 2, from the position where the guide member 80 is at its rear end position, as indicated by the double-dotted chain line of FIG. 9, the upwardly projecting engaging portion 122 of the ejecting member 116 abuts against the horizontal portion 85 of the downwardly extending portion 81 of the guide member 80, as shown in FIG. 10, so that the guide member 80 is moved by the ejecting lever 110, in the direction of arrow 2.

Figure 11:
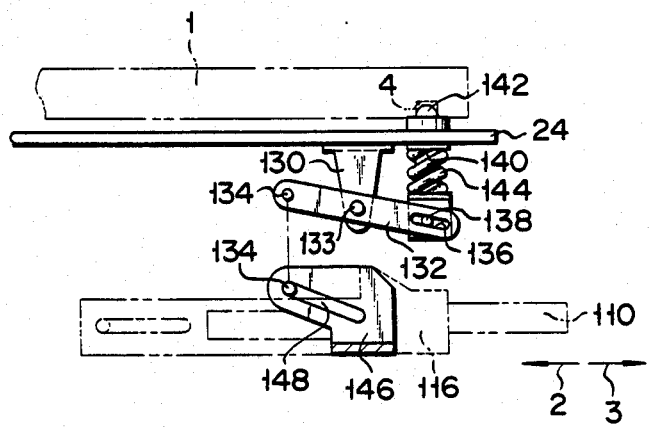
FIGS. 11 and 12 are partial side views for illustrating the operation of a stopper.
Figure 12:
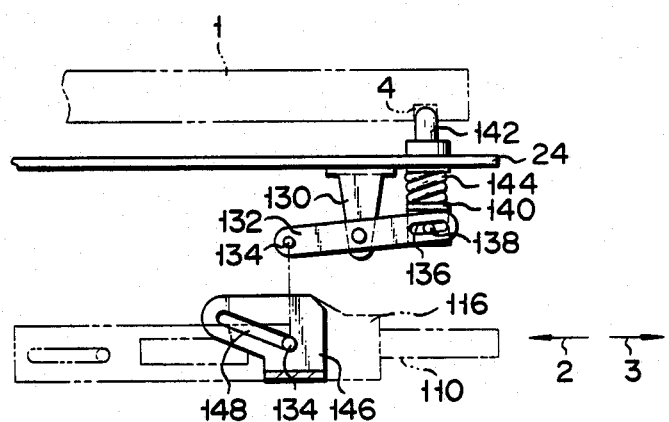

FIGS. 11 and 12 show a stopper 142 for use in preventing the cartridge 1 from unexpectedly jumping out when it is ejected. An interlocking body 146 is fixed to that portion of the ejecting member 116 on the side of the shaft member 94. The interlocking body 146 has a slanted slit 148 which is angled down in the direction of the arrow 3. A support block 130 is fixed to that portion of the undersurface of the chassis 24 which is in alignment with the interlocking body 146.

A rocking lever 132 is pivotally mounted at its substantially central portion on the support block 130. The rocking lever 132 rotates around a rotational axis 133 which extends horizontally and at right angles to the directions of the arrows 2 and 3. The rocking lever 132 has a pin 134 at one end and a slit 136 at the other end extending longitudinally. A pin 134 is fitted in the slanted slit 148, and the pin 134 can move in and along the same.

An elevating shaft 140 is supported on that portion of the chassis 24 which aligns with the slit 136 so that the elevating shaft 140 can move up and down with its longitudinal direction vertical. The stopper 142, which is semispherical in shape, is mounted on the upper end of the elevating shaft 140. A pin 138 at the lower end of the elevating shaft 140 is fitted into the slit 136. A compression spring 144 is fitted around the elevating shaft 140, so that the elevating shaft 140 is urged downward by the compression spring 144.

Accordingly, if the ejecting lever 110 is pushed in the direction of arrow 2, the pin 134 moves along the slanted slit 148, to its lower end, as shown in FIG. 12, so that the rocking lever 132 rocks in such a direction that the pin 134 descends. Thereupon, the slit 136 of the rocking lever 132 rises, so that the elevating shaft 140 is raised, against the urging force of the compression spring 144, by the action of the slit 136 and the pin 138.

On the other hand, when the ejecting lever 110 moves in the direction of arrow 3, as shown in FIG. 11, the pin 134 moves along the slanted slit 148, to its upper end, so that the rocking lever 132 rocks in such a direction that the pin 134 ascends. Thereupon, the elevating shaft 140 is lowered by the descending action of the slit 136 and the pin 138.

As shown in FIG. 3, a pair of stoppers 142 and elevating mechanisms therefore (each including an elevating shaft 140, a support block 130, a rocking lever 132, etc.) are attached to the rear end portion of the chassis 24, spaced in the direction at right angles to the direction of the arrow 2. The pin 134 for the two elevating mechanisms is common—that is, the same pin 134 is fixed to the rocking levers 132 of the two elevating mechanisms. When the pin 134 moves along the slanted slit 148, therefore, the two rocking levers 132 are rocked together by the one pin 134.

A pair of depressions 4 (visible in FIGS. 11 and 12) are formed in the undersurface of the cartridge 1, being so located that they are aligned with corresponding stoppers 142 when the floppy disk in the cartridge 1 engages with the shaft of the motor 26 i.e., when the cartridge 1 is set into the drive system therefore. When the cartridge 1 is set into the drive system, the stoppers 142 are fitted into their corresponding depressions 4.

DESCRIPTION OF THE OPERATION

The operation of the apparatus of the aforementioned construction may be described as follows. The loading operation for the cartridge 1 will be described first.

When the bucket 30 is empty, it is located at its top position, as shown in FIGS. 3 and 5. If the cartridge 1 is inserted into the bucket 30, in the direction of arrow 2, the front end portion of the cartridge 1 abuts against the slider guide pin 44. If the cartridge 1 is further pushed in, the flat slider 42 moves in the direction of arrow 2, against the urging force of the tension spring 48, in such a manner that the slider guide pin 44 is kept in contact with the front end portion of the cartridge 1.

Then, the engaging portion 52 of the flat slider 42 abuts against the retaining portion 106 of the interlocking body 100. Thus, as the flat slider 42 moves in the direction of the arrow 2, the interlocking body 100 rocks against the urging force of the tension spring 108. Thereupon, the pin 88 is disengaged from the rectangular notch 104, as shown in FIG. 6, so that the guide member 80 is moved in the direction of the arrow 3 by the urging force of the tension spring 92. As a result, the pins 40 protruding from that L-shaped lateral portion 34 of the bucket 30 on the side of the supporter 54 descend along their corresponding vertical slits 60 in the supporter 54, restricted in position by the slanted slits 84 in the guide member 80.

As the guide member 80 moves in the direction of the arrow 3, the substantially U-shaped arm 98 is tilted. As the substantially U-shaped arm 98 is tilted in this manner, a downward force is also applied to that L-shaped lateral portion 34 of the bucket 30 which is on the side of the supporter 64, by the action of that end portion of the substantially U-shaped arm 98 which is on the side of the stopper 64 and the horizontal slit 70 in the guide plate 68. Thus, the bucket 30 descends smoothly, and the floppy disk in the cartridge 1 engages with the shaft of the motor 26, in such a way as to be ready for the start of the recording or reproducing operation.

The ejecting operation for the cartridge 1 may be described as follows. If the ejecting lever 110 is pushed in the direction of the arrow 2 by the fingers, the upwardly projecting engaging portion 122 of the ejecting member 116 abuts against the downwardly extending portion 81 of the guide member 80. If the ejecting lever 110 is further pushed in, the guide member 80 moves in the direction of arrow 2. When the guide member 80 advances in the direction of the arrow 2 until the pin 88 reaches the rectangular notch 104, the interlocking body 100 urged by the tension spring 108 rocks in a direction such that the rectangular notch 104 descends, thereby causing the pin 88 to engage the rectangular notch 104.

Thus, although the ejecting lever 110 is set free, the guide member 80 stops against the urging force of the tension spring 92 at the position where the pin 88 engages the rectangular notch 104. While the guide member 80 moves in the direction of the arrow 2, the pair of pins 40 on the side of the supporter 54 move upward in their corresponding vertical slits 60, restricted in position by the slanted slits 84. At the same time, the pair of pins 40 on the side of the supporter 64 are moved upward in their corresponding vertical slits 66 by the action of the substantially U-shaped arm 98 and the horizontal slit 70. Thus, as the guide member 80 moves in the direction of arrow 2, the bucket 30 ascends. While the bucket 30 is moving upward, the cartridge 1 is disengaged from the motor 26.

If the ejecting lever 110 is pushed in the direction of arrow 2, the bucket 30 and the elevating shafts 140 ascend simultaneously. That is, when the ejecting lever 110 moves in the direction of the arrow 2, each rocking lever 132 rocks from the position shown in FIG. 11 toward the position shown in FIG. 12. As a result, each elevating shaft 140 ascends against the urging force of its corresponding compression spring 144. Thus, as the bucket 30 ascends, the elevating shafts 140 ascend in conjunction with the cartridge 1, so that the stoppers 142 are kept engaged with their corresponding depressions 4. Therefore, even if the cartridge 1 is subjected to a force in the direction of arrow 3 (by the flat slider 42 urged in the same direction by the tension spring 48) is disengaged from the motor 26, it will not move in the direction of the arrow 3, since it is retained by the stoppers 142.

Subsequently, if the ejecting lever 110 is set free, the ejecting member 116 is moved in the direction of the arrow 3 by the tension spring 124, and it is returned to the position shown in FIG. 9. As the ejecting member 116 moves in the direction of the arrow 3, the rocking levers 132 rock to lower their corresponding elevating shafts 140. As a result, the stoppers 142 are disengaged from the depressions 4 to set the cartridge 1 entirely free. Thereupon the flat slider 42 is moved in the direction of the arrow 3, by the urging force of the tension spring 48, and the cartridge 1 is pushed out of the bucket 30 by the slider guide pin 44 of the flat slider 42. This is the end of the cartridge ejecting operation.

Thus, even though the ejecting lever 110 is pushed, to disengage the magnetic disk from the motor shaft, the cartridge 1 containing the magnetic disk will not jump suddenly out of the bucket 30. Therefore, the safety of the magnetic disk, motor and magnetic head may be secured.

Since each of the slanted slits 84 of the guide member 80 has the horizontal portion 28 at its upper end portion extended in the direction of the arrow 3, the bucket 30 will not descend accidentally, even if the guide member 80 in its first position (FIG. 5) moves slightly in the direction of the arrow 3. Moreover, even if a downward external force is applied to the bucket 30, the bucket 30 will not descend accidentally since such movement is also prevented by the horizontal portions 78 of the slanted slits 84. Also, in this manner, the safety of the loading/ejecting apparatus may be maintained.

What is claimed is:

1. Apparatus for loading, operating, and ejecting cartridges, said apparatus comprising:
    (a) a chassis;
    (b) a motor having a shaft which, during use of the apparatus, moves a recording medium contained in the cartridge;
    (c) a bucket having a sliding surface located at least substantially at a right angle to said shaft and having facing side edges, said bucket being sized and shaped so that, during use of the apparatus, a cartridge is inserted into said bucket in a first direction and is held in said bucket between said facing side edges;
    (d) supporting means secured to said chassis for supporting said bucket for movement parallel to said shaft between an operative position in which, during use of the apparatus, a recording medium in a cartridge in said bucket can be moved by said shaft and an inoperative position in which a recording medium in a cartridge in said bucket cannot be moved by said shaft;
    (e) a guide member movable relative to said chassis in said first direction and in a second direction, opposite to said first direction, between a first position and a second position;
    (f) first connecting means for operatively connecting said bucket to said guide member so that:
        (i) when said guide member moves from its first position to its second position, said bucket moves from its inoperative position to its operative position and
        (ii), when said guide member moves from its second position to its first position, said bucket moves from its operative position to its inoperative position;
    (g) first urging means for urging said guide member toward its first position;
    (h) retaining means for retaining said guide member in its second position against the urgings of said first urging means;
    (i) sliding release means for releasing said guide member from said retaining means when a cartridge is inserted into said bucket, said sliding release means including a sliding member slidable relative to the sliding surface of said bucket; and
    (j) ejecting means for moving said guide member from its first position to its second position, said ejecting means comprising:
        (i) an ejecting member which is reciprocably movable in said first and second directions and
        (ii) second connecting means for operatively connecting said ejecting member to said guide members such that movement of said ejecting member in said first direction causes said guide member to move to its first position.

2. Apparatus as recited in claim 1 wherein:
    (a) at least two guide pins protrude from each of said facing side edges of said bucket;
    (b) said supporting means comprise a pair of supporters each one of which is located adjacent to and outwardly of a corresponding one of said facing side edges of said bucket; and
    (c) each one of said supporting means contains at least two guide slits extending parallel to said shaft, said guide slits being sized, shaped, and positioned to receive a corresponding one of said at least two guide pins and to guide said bucket as it moves between its operative and inoperative positions.

3. Apparatus as recited in claim 2 wherein:
    (a) said guide member is located adjacent to one of said supporters and
    (b) said guide member contains at least two parallel slanted slits which are neither parallel nor perpendicular to said shaft, said slanted slits being sized, shaped, and positioned to receive a corresponding one of said at least two guide pins.

4. Apparatus as recited in claim 3 wherein said slanted slits in said guide member and said guide slits in the one of said supporters located adjacent to said guide member are arranged so that:
    (a) a first end portion of each one of said slanted slits is aligned with a first end portion of a corresponding one of said guide slits when said guide member is in its first position and (b) a second end portion of each one of said slanted slits is aligned with a second end portion of a corresponding one of said guide slits when said guide member is in its second position.

5. Apparatus as recited in claim 4 wherein each one of said slanted slits has a short extending portion extending in said second direction communicating with its first end portion.

6. Apparatus as recited in claim 1 wherein said ejecting means further comprises:
   (a) a fourth urging means for urging said ejecting member in said second direction;
   (b) a stopper member which is reciprocable in a direction parallel to said shaft between an operative position and an inoperative position, said stopper member being sized, shaped, and positioned so that, when it is in its operative position, it engages a cartridge inserted into said bucket, thereby preventing the cartridge from moving in said second direction;
   (c) shifting means for moving said stopper member back and forth between its operative position and its inoperative position; and
   (d) third connecting means for operatively connecting said ejecting member to said shifting means such that said stopper member moves to its operative position when said ejecting member is moved in said first direction.

7. Apparatus as recited in claim 1 wherein said apparatus is adapted for loading, operating, and ejecting cartridges containing magnetic disks.

8. Apparatus for loading, operating, and ejecting cartridges, said apparatus comprising:
   (a) a chassis;
   (b) a motor having a shaft which, during use of the apparatus, moves a recording medium contained in the cartridge;
   (c) a bucket having a sliding surface located at least substantially at a right angle to said shaft and having facing side edges, said bucket being sized and shaped so that, during use of the apparatus, a cartridge is inserted into said bucket in a first direction and is held in said bucket between said facing side edges;
   (d) supporting means secured to said chassis for supporting said bucket for movement parallel to said shaft between an operative position in which, during use of the apparatus, a recording medium in a cartridge in said bucket can be moved by said shaft and an inoperative position in which a recording medium in a cartridge in said bucket cannot be moved by said shaft;
   (e) a guide member movable relative to said chassis in said first direction and in a second direction, opposite to said first direction, between a first position and a second position;
   (f) first connecting means for operatively connecting said bucket to said guide member so that:
      (i) when said guide member moves from its first position to its second position, said bucket moves from its inoperative position to its operative position and
      (ii), when said guide member moves from its second position to its first position, said bucket moves from its operative position to its inoperative position;
   (g) first urging means for urging said guide member toward its first position;
   (h) retaining means for retaining said guide member in its second position against the urgings of said first urging means;
   (i) sliding release means for releasing said guide member from said retaining means when a cartridge is inserted into said bucket, said sliding release means including a sliding member slidable relative to the sliding surface of said bucket; and
   (j) ejecting means for moving said guide member from its first position to its second position, wherein:
   (k) at least two guide pins protrude from each of said facing side edges of said bucket;
   (l) said supporting means comprise a pair of supporters each one of which is located adjacent to and outwardly of a corresponding one of said facing side edges of said bucket;
   (m) each one of said supporting means contains at least two guide slits extending parallel to said shaft, said guide slits being sized, shaped, and positioned to receive a corresponding one of said at least two guide pins and to guide said bucket at it moves between its operative and inoperative positions;
   (n) said guide member is located adjacent to one of said supports;
   (o) said guide member contains at least two parallel slanted slits which are neither parallel nor perpendicular to said shaft, said slanted slits being sized, shaped, and positioned to receive a corresponding one of said at least two guide pins;
   (p) said slanted slits in said guide member and said guide slits in the one of said supporters located adjacent to said guide member are arranged so that:
      (i) a first end portion of each one of said slanted slits is aligned with a first end portion of a corresponding one of said guide slits when said guide member is in its first position and
      (ii) a second end portion of each one of said slanted slits is aligned with a second end portion of a corresponding one of said guide slits when said guide member is in its second position;
   (q) each one of said slanted slits has a short extending portion extending in said second direction communicating with its first end portion;
   (r) a retaining pin protrudes from said guide member;
   (s) said retaining means includes an interlocking body mounted for pivotal movement about a first axis extending at a right angle to said first direction;
   (t) said interlocking body has an engaging notch sized, shaped, and positioned to releasably engage said retaining pin;
   (u) said interlocking body has a retaining portion sized, shaped, and positioned to be contacted by said sliding member;
   (v) contact of said sliding member with said retaining portion of said interlocking body causes said interlocking body to pivot about said first axis and the pivotal movement of said interlocking body about said first axis causes said retaining pin to disengage from said engaging notch;
   (w) said retaining means includes a second urging means for urging said interlocking body to pivot in the direction such that said engaging notch can engage said retaining pin;
   (x) said sliding release means includes a third urging means for urging said sliding member in said second direction; and (y) said sliding release means includes a pin projecting from said sliding member in a direction parallel to said shaft, said pin being sized, shaped, and positioned to be contacted by the leading edge of a cartridge being inserted into said bucket, whereby the insertion of the cartridge causes said sliding member to slide relative to said bucket on said sliding surface of said bucket.

9. Apparatus for loading, operating, and ejecting cartridges, said apparatus comprising:
   (a) a chassis;
   (b) a motor having a shaft which, during use of the apparatus, moves a recording medium contained in the cartridge;
   (c) a bucket having a sliding surface located at least substantially at a right angle to said shaft and having facing side edges, said bucket being sized and shaped so that, during use of the apparatus, a cartridge is inserted into said bucket in a first direction and is held in said bucket between said facing side edges;
   (d) supporting means secured to said chassis for supporting said bucket for movement parallel to said shaft between an operative position in which, during use of the apparatus, a recording medium in a cartridge in said bucket can be moved by said shaft and an inoperative position in which a recording medium in a cartridge in said bucket cannot be moved by said shaft;
   (e) a guide member movable relative to said chassis in said first direction and in a second direction, opposite to said first direction, between a first position and a second position;
   (f) first connecting means for operatively connecting said bucket to said guide member so that:
      (i) when said guide member moves from its first position to its second position, said bucket moves from its inoperative position to its operative position and
      (ii), when said guide member moves from its second position to its first position, said bucket moves from its operative position to its inoperative position;
   (g) first urging means for urging said guide member toward its first position;
   (h) retaining means for retaining said guide member in its second position against the urgings of said first urging means;
   (i) sliding release means for releasing said guide member from said retaining means when a cartridge is inserted into said bucket, said sliding release means including a sliding member slidable relative to the sliding surface of said bucket; and
   (j) ejecting means for moving said guide member from its first position to its second position, wherein:
   (k) at least two guide pins protrude from each of said facing side edges of said bucket;
   (l) said supporting means comprise a pair of supporters each one of which is located adjacent to and outwardly of a corresponding one of said facing side edges of said bucket; and
   (m) each one of said supporting means contains at least two guide slits extending parallel to said shaft, said guide slits being sized, shaped, and positioned to receive a corresponding one of said at least two guide pins and to guide said bucket as it moves between its operative and inoperative positions;
   (n) said guide member is located adjacent to one of said supporters;
   (o) said guide member contains at least two parallel slanted slits which are neither parallel nor perpendicular to said shaft, said slanted slits being sized, shaped, and positioned to receive a corresponding one of said at least two guide pins; and
   (p) said first connecting means comprise:
      (i) a guide plate attached to said bucket on the side thereof remote from said guide member and
      (ii) an arm member coupled between said guide plate and said guide member, said arm member:
         (A) being movable relative to said guide plate in said second direction and being movable with said bucket in a direction parallel to said shaft and
         (B) being movable relative to said member in a direction parallel to said shaft and being movable with said guide plate in said first and second directions.

10. Apparatus as recited in claim 9 wherein:
   (a) said guide member has a first slit extending in parallel to said shaft;
   (b) said guide plate has a second slit extending in parallel to said first direction;
   (c) a first end portion of said arm member is slidably received in said first slit;
   (d) a second end portion of said arm member is slidably received in said second slit; and
   (e) motion of said guide member in a direction parallel to and in a direction opposite to said first and second directions is transmitted through said arm member, which causes said guide plate to reciprocate a direction parallel to said shaft.

* * * * *